L. RUPP.
BEATER OR MIXER.
APPLICATION FILED DEC. 13, 1916.
1,243,982.
Patented Oct. 23, 1917.
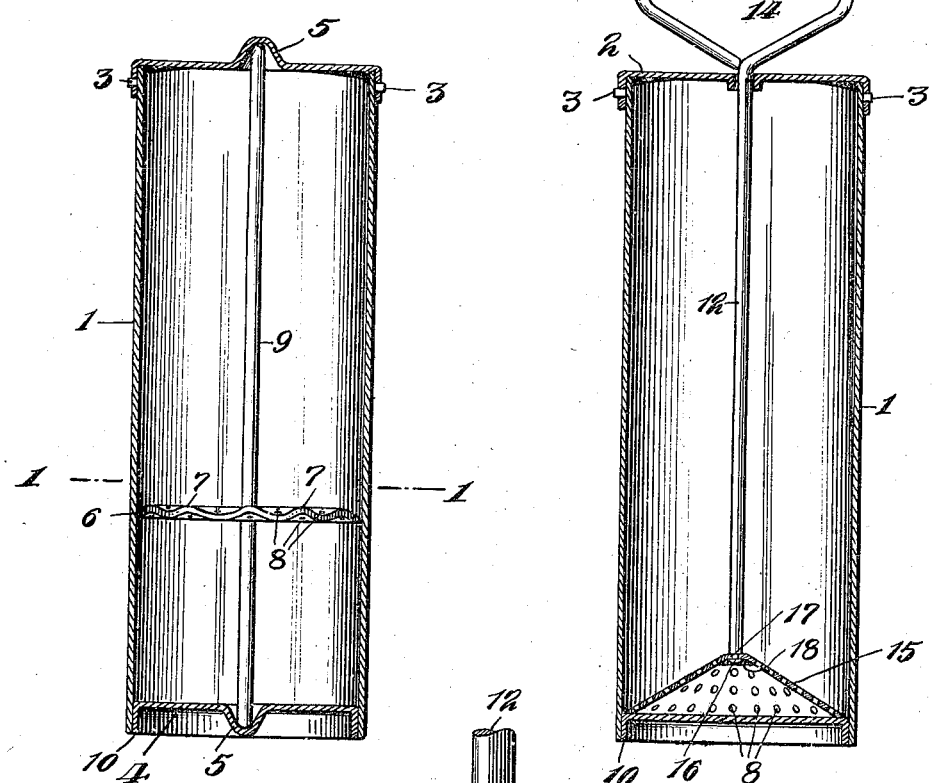
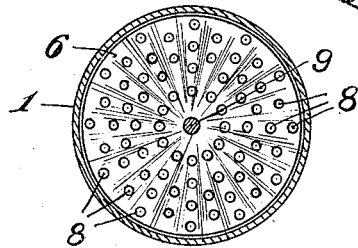
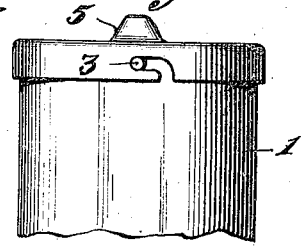
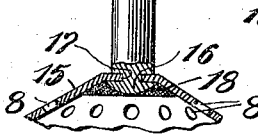
INVENTOR
Laurente Rupp,
BY
William Richards
ATTORNEY

UNITED STATES PATENT OFFICE.

LAURENTE RUPP, OF NEW YORK, N. Y.

BEATER OR MIXER.

1,243,982.  Specification of Letters Patent.   Patented Oct. 23, 1917.

Application filed December 13, 1916.   Serial No. 136,677.

*To all whom it may concern:*

Be it known that I, LAURENTE RUPP, a citizen of the United States, residing in the city, county, and State of New York, have invented a new and useful Improvement in Beaters or Mixers, of which the following is a specification.

This invention relates to beaters and mixers, and has for its object to construct such articles with but few parts, and in an extremely simple form, and so that they will be at once efficient, easy to use, cheap in construction, and not liable to get out of order.

These and other objects of my invention are set forth in the following specification, and shown in the accompanying drawings, the particular features of novelty which constitute my invention being pointed out in the claims at the end of this specification.

In the drawings, which form a part of this specification, and in which similar letters and figures of reference refer to corresponding parts wherever they occur:—

Figure 1 is a central vertical section of one of my improved beaters, the agitator stem being shown in full lines;

Fig. 2 is a side elevation of the top portion of the beater shown in Fig. 1;

Fig. 3 is a transverse section taken on the line 1—1 of Fig. 1;

Fig. 4 is a central vertical section of a modified form of my beater;

Fig. 5 is an enlarged detail view of a portion of the agitator and stem shown in Fig. 4, illustrating means for securing them together; and, Fig. 6 is an enlarged sectional view of a portion of the agitator showing its perforations with their projecting rims.

In the drawings, 1 is an outer container, preferably of cylindrical shape, formed of sheet metal or other desired material, which is provided with a cover 2, adapted to be secured to the top of the container by bayonet joints 3, (see Fig. 2,) or by any other desired fastening means, and with a bottom 4.

The cover 2, and bottom 4, are respectively provided with centrally and oppositely disposed conical concavities 5, 5, to receive and hold the ends of the agitator stem, as hereinafter more fully described.

I form my agitator 6 of a thin sheet metal plate, which corresponds in shape and size with the interior of the container, and fits within the same transversely and closely. The agitator 6 is formed with a series of radial corrugations 7, forming beating surfaces which are conically shaped in cross section, and with numerous perforations 8, which are pricked or punched through the metal from one side to the other to form sharp, projecting, irregular rims 21, which serve to cut and tear the materials being beaten or mixed, and greatly facilitate the operation of the beater.

I mount my agitator rigidly between the ends of a stem 9, by soldering it thereto, or in any other desired manner, said stem being so formed that its ends will project into the concavities 5, 5, in the cover and bottom of the container, abutting against the walls of the same, and so that the stem will be held firmly in place therebetween when the cover is fastened upon the top of the container.

The bottom 4 of the container is preferably provided with a circumferential flange 10, and is inserted into, and fastened in the end of the container in such manner that the wall of the concavity 5 will not project beyond the plane of the end of the container.

In operation, the cover is first removed, and the eggs or other materials to be beaten or mixed are placed within the container. The cover 2 is then placed and fastened in position, thereby securing the ends of the stem in the concavities. The container and its contents are then shaken by the user, the contents being thereby forcibly beaten against and through the perforated agitator and its sharp projecting rims 21.

In a very brief period of time a thorough beating and mixing of the materials will be accomplished by the action of my beater, and its radial, conically shaped corrugations, and the rimmed perforations of the agitator.

In Figs. 4 and 5 I show a modified form of my invention, in which an elongated stem 12 is employed, one end of which is passed through the cover of the container, and is bent around upon itself for the purpose of forming a handle 14, while the agitator 15 is secured to the other end of the stem.

In this modified form I prefer to construct the agitator in a conical shape with its apex projecting upwardly, and, as shown in the drawings, I form the lower end 16 of the stem of a reduced diameter, and pass this end through an opening 17 in the top of the agitator, and upset the end 16 of the stem against the underside of the agitator, as shown at 18, and then apply solder 19 over the joint thus formed.

A bushing 20 may be formed in the cover of the container around the opening 17 to act as a bearing for the stem 12, and also to prevent particles of the materials being beaten being drawn through the cover to the outside thereof.

The agitator 15 is provided with perforations 8, which are pricked or punched through the metal to form sharp projecting rims therefor, as shown at 21 in Fig. 6.

I employ the form of beater shown in Figs. 1 to 3 inclusive, when beating or mixing small quantities of materials, the form shown in Fig. 4 being used when large quantities of materials are to be beaten or mixed at the same time; in this case the agitator 15 is moved up and down in the container by means of the handle 14.

What I claim as new and desire to secure by Letters Patent is:—

1. A beater or mixer comprising a container, and an agitator supported transversely within said container, said agitator being formed with radial corrugations and having perforations arranged along the lines of said corrugations, said corrugations forming radial, conically shaped beating surfaces.

2. A beater or mixer comprising a container, an agitator arranged transversely between the walls of said container having a series of perforations provided with sharp laterally projecting rims, and means for supporting said agitator.

3. A beater or mixer comprising a container, an agitator arranged transversely between the walls of said container having a series of perforations with sharp laterally projecting rims, a part of said rims projecting to the one side, and a part to the other side of said agitator.

4. A beater or mixer comprising a container having a cover and a bottom provided with oppositely arranged conically shaped concavities, a stem held between the walls of said concavities, and an agitator having radial corrugations each of said corrugations being provided with a series of perforations along its length.

5. A beater or mixer comprising a container having a cover and a bottom provided with oppositely arranged conically shaped concavities, a stem held rigidly between the walls of said concavities, and a radially corrugated transverse agitator having perforations formed along the lines of the corrugations, said agitator being secured to said stem between its ends.

In testimony whereof, I have signed my name to this specification, this 18th day of November, 1916.

LAURENTE RUPP.

Copies of this patent may be obtained for five cents each, by addressing the "Commissioner of Patents, Washington, D. C."